United States Patent [19]

Samueli

[11] Patent Number: 4,600,152
[45] Date of Patent: Jul. 15, 1986

[54] MULTIPLE INTERSECTION DRIPPER

[76] Inventor: Samuel Samueli, 32 Beech St., N. Arlington, N.J. 07032

[21] Appl. No.: 501,621

[22] Filed: Jun. 6, 1983

[51] Int. Cl.⁴ .................................................. A01G 25/00
[52] U.S. Cl. .......................................... 239/542; 138/42
[58] Field of Search ................... 239/542, 547; 138/42

[56] References Cited

U.S. PATENT DOCUMENTS

| 3,688,800 | 9/1972 | Hayner et al. | 138/42 |
| 4,199,106 | 4/1980 | Kojimoto et al. | 239/542 |
| 4,473,191 | 9/1984 | Chapin | 239/542 |

FOREIGN PATENT DOCUMENTS

| 2224320 | 12/1972 | Fed. Rep. of Germany | 239/542 |
| 718056 | 2/1980 | U.S.S.R. | 239/542 |

Primary Examiner—Andres Kashnikow
Attorney, Agent, or Firm—Benjamin J. Barish

[57] ABSTRACT

A water irrigation emitter comprises a labyrinth in which the main flowpath is divided into a plurality of branches, and each of the branches is in turn divided into a plurality of sub-branches, the sub-branches being oriented such that the water flowing through each of the sub-branches of one branch intersect the water flowing through each sub-branch of the other branch at a plurality of intersection points. This to dissipates a substantial amount of the water energy to produce a low flow rate while still enabling the use of passageways of relatively large cross-section which are not susceptible to clogging. The flow rate may be further reduced by the provision of obstructions at the centers of each of the intersections.

10 Claims, 5 Drawing Figures

1

MULTIPLE INTERSECTION DRIPPER

BACKGROUND OF THE INVENTION

The present invention relates to water irrigation systems, and particularly to water irrigation drippers used in such system.

Water irrigation drippers are now widely used in supplying water at a low rate directly to the root region of the plants being irrigated. The known drippers are usually divided into point-source emitters in which the water is emitted from a point, and linear-source emitters, sometimes called tube drippers, in which the water is emitted along a line. The point-source emitters are, in turn, usually divided mostly into: the labyrinth type, having a lengthy intricate passageway for the water to flow; the aperture-type having a small diameter aperture for metering the flow to the slow flow rate; and the floating type, having a floating member controlling the inlet/or outlet to produce the slow flow rate. The dripper of the present invention is directed to the above-mentioned labyrinth type of point-source emitter.

BRIEF SUMMARY OF THE INVENTION

According to a broad aspect of the present invention, there is provided a water irrigation dripper including a pressure-dropping labyrinth for the water flowing from an inlet to an outlet of the dripper, said labyrinth including at least one section defining a main flowpath for the water, said main flowpath being divided into a plurality of branches, each of said branches being divided into a plurality of sub-branches oriented such that the water flowing through each of the sub-branches of one branch intersect the water flowing through each sub-branch of another branch at at least one intersection point, thereby to dissipate energy of said water before the water leaves the respective section and returns to the main flowpath.

In the described preferred embodiment, the main flowpath includes a plurality of sections connected in series with each other from the dripper inlet to the dripper outlet.

A water irrigation dripper constructed in accordance with the foregoing featues provides a number of important advantages over the known constructions. Thus, by dividing the main flowpath into a plurality of branches and sub-branches which produce a plurality of water streams intersecting each other at a plurality of intersections points, a considerable portion of the energy of the water is dissipated by these intersections. This permits the passageways to be of larger cross-sectional area and of smaller length than would otherwise be required. The drippers may therefore be constructed with less sensitivity to clogging and of smaller size than the conventional constructions.

Further features and advantages of the invention will be apparent from the description below.

BRIEF DESCRIPTION OF THE DRAWINGS

The invention is herein described, by way of example only, with reference to the accompanying drawings, wherein:

FIG. 1a is an end view along lines A—A of FIG. 1;

FIG. 1b is a sectional view along lines B—B of FIG. 1;

DESCRIPTION OF A PREFERRED EMBODIMENT

Figure 1:
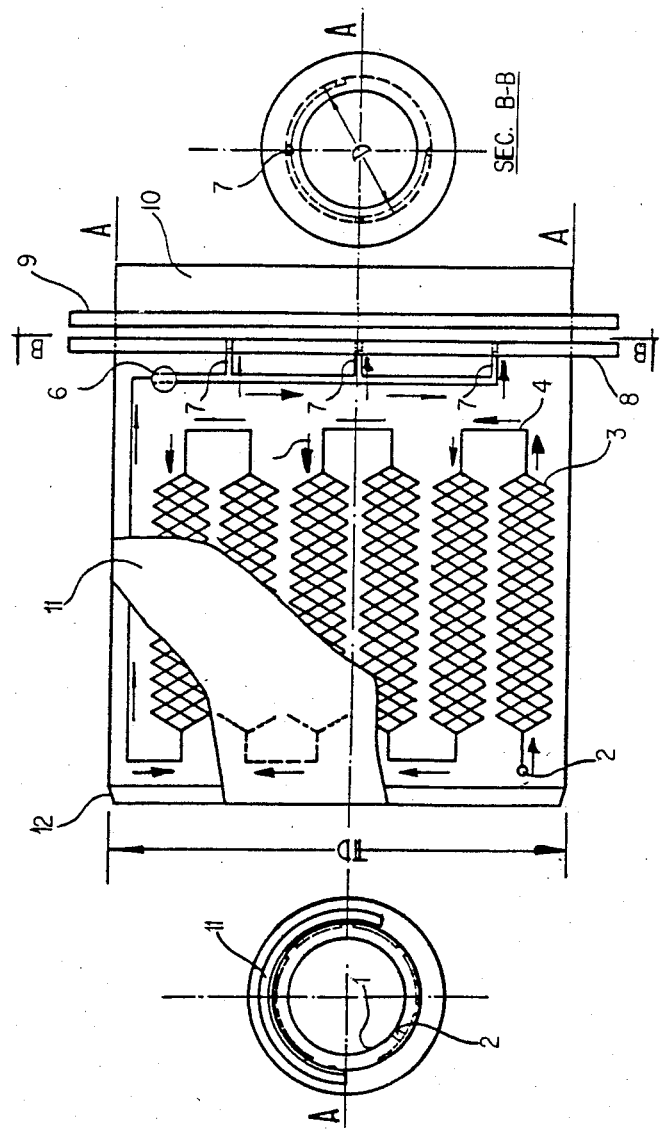
FIG. 1 is view, partly broken away to show internal structure, illustrating one form of water irrigation dripper constructed in accordance with the present invention.

The dripper illustrated in FIG. 1 is of the type which includes an inner cylindrical member, generally designated 10, received within an outer cylindrical member 11. The outer face of the inner member 10 is formed with a plurality of recesses defining, with the inner face of the outer member 11, a labyrinth of flowpaths for dropping the pressure of the fluid (e.g. water) flowing from the inlet, defined by opening 2, to the outlet, defined by a plurality of openings 7. The labyrinth includes at least one section 3 (six such sections being seen in FIG. 1) defining a main flowpath, represented by flowpath 4, for the water, the main flowpath being divided into a plurality of branches. Each of these branches is in turn divided into a plurality of sub-branches oriented such that the water flowing through each sub-branch of one branch intersects the water flowing through the sub-branches of another branch at a plurality of intersection points. This arrangement thereby dissipates energy of the water before the water leaves the respective section 3 and returns to the main flowpath 4.

Figure 2:
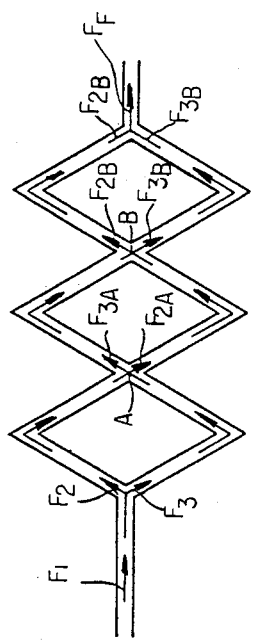
FIGS. 2 and 3 are diagrams helpful in explaining how the dripper of FIG. 1 dissipates energy.
Figure 3:
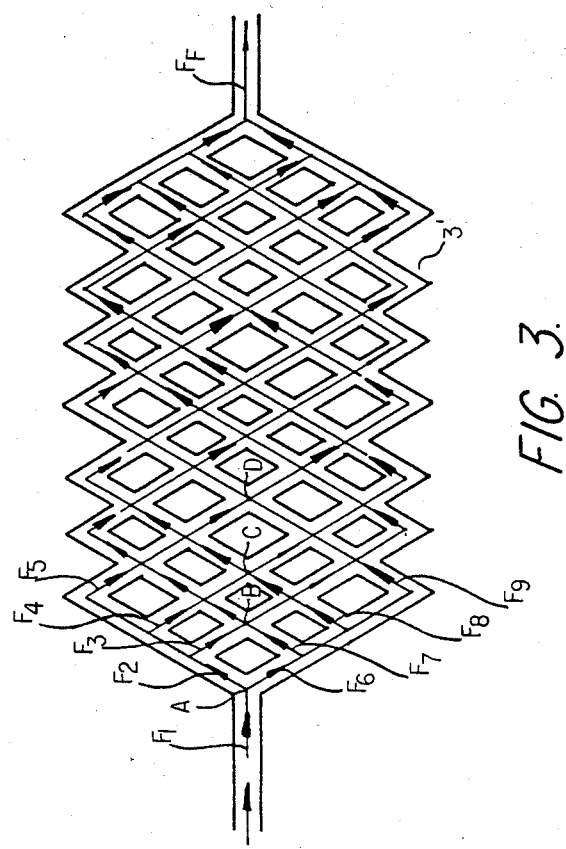

The manner in which a considerable portion of the energy of the water is dissipated by the above-described arrangement of branches and sub-branches will be apparent from the description of FIG. 3 illustrating one such multi-branch labyrinth section as represented by the reference numeral 3 in FIG. 1. However, FIG. 1 illustrates labyrinth section 3 as including two branches, with each branch including two sub-branches, and each sub-branch of one branch intersecting each sub-branch of the other branch at seven intersection points, before the water re-merges to return to the main flowpath; whereas in FIG. 3, each labyrinth section 3' includes two branches, three sub-branches, and two intersection points of each sub-branch of one branch with each sub-branch of the other branch. However, before describing the action occurring in labyrinth section 3' illustrated in FIG. 3, it will first be helpful to describe the simpler labyrinth arrangement illustrated in FIG. 2, the latter involving two branches, no sub-branches but intersecting each other at three intersection points.

Thus, as shown in FIG. 2, the water flow through the main flowpath, indicated as $F_1$, is split into two branches streams $F_2$, $F_3$. These two streams collide with each other at intersection point A, thereby dissipating some of the energy originally in the streams. Thus, the streams $F_{2A}$, $F_{3A}$, leaving intersection point A will be at a lower velocity than streams $F_2$, $F_3$ entering the intersection point.

The same process repeats itself at intersection point B, the streams $F_{2B}$, $F_{3B}$, thereby also being at a lower velocity than streams $F_{3A}$, $F_{2A}$ entering intersection point B. Streams $F_{2B}$, $F_{3B}$ then meet again at the merging point where they are combined as full flow stream $F_F$. In view of the substantial energy dissipated at the intersection points A and B, it will be appreciated that the stream $F_F$ leaving the merging point has considerable less energy, and therefore a substantially lower flow rate, than the initial stream $F_1$ before it reached the branching point.

FIG. 3 illustrates a labyrinth arrangement including branches and sub-branches which further increases this dissipation of energy at the intersection points by one or more orders of magnitude. Thus, the labyrinth arrangement illustrated in FIG. 3 splits the initial stream $F_1$ at branching point A into two branches $F_2$, $F_6$, with each branch being in turn divided into three sub-branches, namely $F_3$, $F_4$, $F_5$ for branch $F_2$, and sub-branches $F_7$, $F_8$, $F_9$ for branch $F_6$. Thus, after the water stream $F_1$ branches into the two branches $F_2$, $F_6$ at point A, its sub-branch $F_3$ intersects sub-branch $F_7$ at point B, sub-branches F7, F8 and F9 of branch $F_6$, and then again all of the latter sub-branches before re-merging at the main flowpath as the full flow stream $F_F$. Similarly, sub-branch $F_4$ intersects sub-branch $F_8$ at point C, and then all the other sub-branches of branch $F_6$ twice more; and sub-branch $F_5$ intersects sub-branch $F_9$ at point D and then all the other sub-branches of branch $F_6$ twice more. At each of these intersection points, energy in the intersecting streams is dissipated, as described above with respect to FIG. 2.

Although labyrinth section 3 illustrated in FIG. 1 includes only two sub-branches for each branch, rather than three sub-branches as in FIG. 3, each sub-branch of one branch includes seven intersection points with each sub-branch of the other branch, before finally merging at the end of the labyrinth section. Accordingly, the energy dissipated in labyrinth section 3 illustrated in FIG. 1 will also be very high, considerably higher than that of labyrinth section 3' illustrated in FIG. 3.

As shown in FIG. 1, the main flowpath 4 includes a plurality of labyrinth sections 3 connected in series with each other from the dripper inlet 2 to the dripper outlet 7. Six such labyrinth sections 3 are illustrated in FIG. 1, but it will be appreciated that such labyrinth sections could extend completely around the circumference of the circular dripper, thereby substantially increasing the number of such sections.

FIG. 1 further illustrates the use of a plurality of outlet openings 7 all connected to the last labyrinth section 3 by an outlet groove 6. A plurality of such openings are provided in case one or more become clogged by foreign particles.

A pair of annular ribs 8, 9 are formed on the outer cylindrical member 11 in order to space its outer surface formed with the outlet openings 7 from the ground, to minimize the possibility of clogging of the outlets by dirt particles. FIG. 1 further illustrates the leading edge of the outer cylindrical member 11 being formed with a tapered surface 12 to facilitate its connection to the water supply line.

Figure 4:
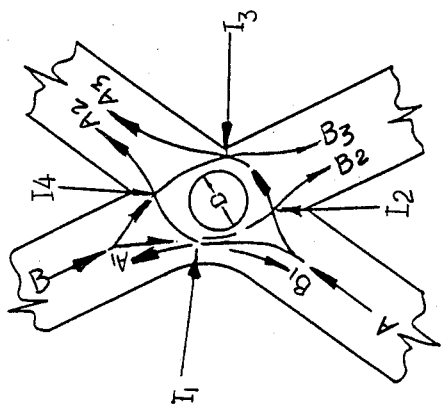
FIG. 4 is an enlarged fragmentary view illustrating a modification that may be made in the dripper of FIG. 1, namely by providing an obstruction at the intersection points.
Figure 5:
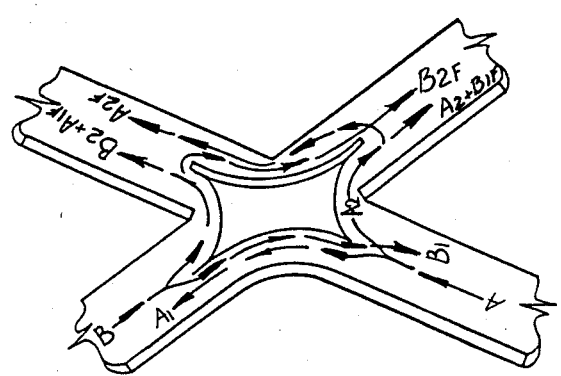
FIG. 5 is a view similar to that of FIG. 4 but illustrating another configuration of obstruction that may be used at the intersection points.

FIGS. 4 and 5 diagrammatically illustrate modifications that may be made at each of the described intersections in order to increase the dissipation of energy at these intersections. This is done in the modification of FIGS. 4 and 5 by the provision of an obstruction at these intersections, which obstruction increase the energy loss by further splitting the fluid streams and creating additional or secondary intersections.

FIG. 4 illustrates the obstruction, therein designated D, as of cylindrical configuration and interposed in the center of the intersections of two flow paths A, B. Thus, the fluid flowing through path A will be split by obstruction D into three streams, $A_1$, $A_2$, $A_3$; and a similarly, the fluid flowing through path B will be split by the obstruction into three streams $B_1$, $B_2$ and $B_3$. At point $I_1$, streams $A_1$ and $B_1$ oppose each other; at point $I_2$, stream $A_3$ intersects with stream $B_2$; at point $I_3$, stream $A_3$ intersects with stream $B_3$; and at point $I_4$, stream $A_2$ intersects with stream $B_3$. These intersections produce collisions which dissipate further energy and thereby further reduce the flow rates.

FIG. 5 illustrates a variation wherein the obstruction is of polygonal configuration, rather than of cylindrical configuration, with the sides of the polygon being somewhat concave. Thus, stream A splits into streams $A_1$, $A_2$; and stream B will split into streams $B_1$, $B_2$. Streams $A_1$ and $B_1$ are in opposing directions, thereby producing a loss of energy. Stream $A_2$ also intersects stream $B_1$, and at the fourth intersection point, also intersects stream $B_2$, such that the intersecting streams produce a great loss of energy thereby decreasing the flow rates.

It will thus been seen that the invention provides a dripper having a labyrinth construction which dissipates substantial amounts of energy at the intersections of the sub-branches, thereby permitting the passageways to be of larger cross-sectional area and of smaller length than would otherwise be required. Accordingly, drippers can be constructed with less sensitivity to clogging and a smaller size than conventional constructions.

While the invention has been described with respect to several preferred embodiments, it will be appreciated that many other variations, modifications and applications of the invention may be made.

What is claimed is:

1. A water irrigation dripper including a pressure-dropping labyrinth for the water flowing from an inlet to an outlet of the dripper, said labyrinth including at least one section defining a main flowpath for the water, said main flowpath being divided into a plurality of at least two branches, each of said branches being divided into a plurality of sub-branches oriented such that the water flowing through each of the sub-branches of one branch intersects the water flowing through each sub-branch of the other branch at at least one intersection point, thereby to dissipate energy of said water before the water leaves the respective section and returns to the main flowpath.

2. The dripper according to claim 1 wherein the water of each sub-branch of one branch intersects the water flowing through each sub-branch of the other branch at a plurality of intersection points before returning to the main flowpath.

3. The dripper according to claim 1, wherein said sub-branches from each branch extend parallel to each other such that the sub-branches of one branch intersect all the sub-branches of the other branch at the same angle.

4. The dripper according to claim 1, wherein said sub-branches of one branch intersect the sub-branches of the other branch at an obtuse angle.

5. The dripper according to claim 1, wherein there is an obstruction at the center of each of said intersections effective to dissipate further energy of the water streams intesecting at the respective intersection.

6. The dripper according to claim 5, wherein each of said obstructions is of circular cross-section.

7. The dripper according to claim 5, wherein each of said obstructions is of generally polygonal cross-section and has concavely-curved sides.

8. The dripper according to claim 7, wherein each of said obstructions is of generally rectangular cross-section.

9. The dripper according to claim 1, wherein said main flowpath includes a plurality of said labyrinth sections connected in series with each other from the dripper inlet to the dripper outlet, each of said sections including said plurality of branches each divided into said plurality of sub-branches.

10. A dripper according to claim 1, wherein said dripper includes an outer cylinder member and an inner cylinder member, said labyrinth being defined by a grooved-outer surface of said inner member and the inner face of said outer member.

* * * * *